United States Patent [19]

Mori et al.

[11] 3,921,064

[45] Nov. 18, 1975

[54] POWER SOURCE CHECKER DEVICE
[75] Inventors: Chiharu Mori; Masahiro Kawasaki, both of Tokyo, Japan
[73] Assignee: Asahi Kogaku Kogyo Kabushiki Kaisha, Tokyo, Japan
[22] Filed: Apr. 17, 1974
[21] Appl. No.: 461,598

[30] Foreign Application Priority Data
Apr. 26, 1973 Japan.................. 48-51049[U]

[52] U.S. Cl. .................. 324/29.5; 340/249; 320/48
[51] Int. Cl.².......................................... G01N 27/42
[58] Field of Search ............. 324/29.5, 76; 136/182; 340/248 B, 248 C, 248 D, 249; 320/48

[56] References Cited
UNITED STATES PATENTS

| | | | |
|---|---|---|---|
| 3,670,246 | 6/1972 | Gately................................ | 324/29.5 |
| 3,832,629 | 8/1974 | Cernek............................. | 324/29.5 |

*Primary Examiner*—Alfred E. Smith
*Assistant Examiner*—Michael J. Tokar
*Attorney, Agent, or Firm*—Christie, Parker & Hale

[57] ABSTRACT

This device provides for checking whether a power source terminal voltage exceeds a minimum requirement. A luminescent diode serves as a controllable indicator element for the device and also serves as a circuit element across which a reference voltage is developed. In operation, when the terminal voltage exceeds the minimum requirement, the reference voltage and a detection voltage differ in magnitude by at least a predetermined amount, a comparison circuit forms a positive feedback control signal, and a switching circuit responds thereto to close a positive feedback loop leading to an increase in both the current flowing through the diode and the reference voltage developed across it.

1 Claim, 1 Drawing Figure

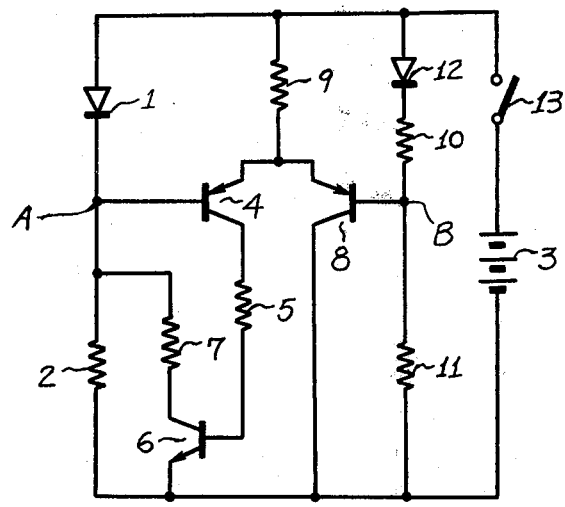

POWER SOURCE CHECKER DEVICE

BACKGROUND OF THE INVENTION

This invention relates to devices for checking and indicating whether the terminal voltage provided by a power source is sufficiently high as to be serviceable.

Many different kinds of instruments have replaceable electrical power supplies. As a typical example, a camera having a built-in automatic exposure control system will employ a replaceable battery as a power source for energizing the circuitry of the exposure control system. The useful life of these batteries is limited in that eventually with aging and continued use the battery terminal voltage decreases below a minimum threshold level required for serviceability. Whenever the exposure control system does not receive adequate electrical power and the photographer is unaware of the problem, the photographs taken will in all probability be improperly exposed.

Accordingly, there have been developed checking devices that the photographers can use to check whether the battery is serviceable or needs replacement. These checking devices include detection circuitry that senses the battery terminal voltage and an indicator element responsive to the detection circuitry for visually indicating whether the voltage is above or below such a threshold level.

The detecting circuitry in conventional devices of this type include a reverse-biased Zener diode. Current is supplied to the Zener diode from the battery through a dropping resistor when a switch is closed to turn on the detection circuitry. With this current flowing through it there is developed across the reverse-biased Zener diode a breakdown voltage that serves as a reference voltage. The switch also connects the battery to a voltage divider resistor network whereby there is developed across one of the network resistors a partial voltage whose magnitude is directly proportional to the battery terminal voltage. A comparator circuit compares the partial voltage with the reference voltage to determine which is greater and selectively illuminates the indicator element in accordance with the determination.

Zener diodes have been used in the practice of the prior art because the breakdown voltage of a Zener diode remains substantially the same despite appreciable changes in the current flowing through it. That is, the reference voltage it provides with current being supplied to it from the battery is not influenced by the battery voltage. Accordingly, a constant reference voltage is made available to the comparator circuit regardless of the magnitude of the battery terminal voltage.

Although a Zener diode possesses this advantageous characteristic, it has certain disadvantages arising particularly in connection with integrated circuits. More specifically, difficulties are encountered in the configuration and cost of the Zener diode. Furthermore, the above-described arrangement of the detection circuitry which employs a Zener diode makes it necessary to have a high gain comparator circuit so as to attain a desired discrimination ratio.

SUMMARY OF THE INVENTION

In one distinguishing feature, the device of this invention employs a luminescent diode not only as a controllable indicator element but also as a circuit element across which there is developed a reference voltage. This is an important feature because it eliminates the above-described problems attendant the use of a Zener diode in providing a reference voltage.

The device includes first and second current flow paths that are arranged in parallel to draw respective currents from the power source to be checked. The current flow paths include circuit elements that are arranged to provide reference and detection voltages differing in magnitude by at least a predetermined amount when the power source terminal voltage exceeds a minimum requirement. The luminescent diode, so as to perform its function as one of these circuit elements, is connected in the first current flow path such that it is forward biased and has the reference voltage developed across it. With respect to its function as an indicator element, the diode lights up when there is current flowing through it in excess of a threshold value.

In another distinguishing feature of the device, there is provided an arrangement employing positive feedback resulting in an improved discrimination ratio. To this end, comparison circuit means are provided for producing a positive feedback control signal when the reference and detection voltages differ by at least the predetermined amount. The comparison circuit means has a first input connected to respond to the reference voltage, a second input connected to respond to the detection voltage, and an output on which it produces the positive feedback control signal. There is further provided switching circuit means responsive to the positive feedback control signal for closing a positive feedback loop so as to increase both the current flowing through the diode and the reference voltage developed across it.

BRIEF DESCRIPTION OF THE DRAWING

The sole FIGURE is a schematic diagram illustrating the preferred arrangement of the device of this invention.

DETAILED DESCRIPTION

The cathode of a luminescent diode 1 and one end of a current limiting resistor 2 are connected together to form a node A of a first current flow path that draws current from a power source 3 when the power source is being checked. In addition to serving as a circuit element of the first current flow path, the luminescent diode also serves as a controllable visual indicator. If in a checking operation it is determined that the actual power source terminal voltage (sometimes hereinafter referred to as E) exceeds a minimum requirement (sometimes hereinafter referred to as $E_s$), the luminescent diode lights up; otherwise it remains dark.

A characteristic of a luminescent diode is that it lights up when as a result of being sufficiently forward biased there is current flowing through it in excess of a threshold value. The current limiting resistor 2 is selected as to its resistance value such that the current flowing through the first current flow path is less than this threshold value under circumstances in which the terminal voltage E is below the minimum requirement $E_s$.

In parallel with the first current flow path, there is a second current flow path which includes a node B and which also draws current from the power source 3 during the checking operation.

The circuit elements of the first and second current flow paths are arranged so that there are produced reference and detection voltages that differ in magnitude by at least a predetermined amount when the power source terminal voltage exceeds the minimum requirement. The reference voltage (hereinafter sometimes referred to as $V_A$) is developed across the forward-biased diode 1. The detection voltage (hereinafter sometimes referred to as $V_B$) is developed between two nodes of the second current flow path; one of these two being defined at the interconnection with the anode of the diode 1 and the other being the node B.

The node A is connected to the base electrode of a switching transistor 4. The collector electrode of the transistor 4 is connected through a resistor 5 to the base electrode of a switching transistor 6. The collector electrode of the transistor 6 is connected through a resistor 7 to the node A. In operation, when the reference and detection voltages differ by the predetermined amount, the transistor 4 begins to conduct and its collector current serves as a positive feedback control signal. This collector current is provided as base current to the transistor 6 thereby causing it to draw current through the resistor 7. The transistor 6 and the resistor 7 thus serve as a switching means for closing a positive feedback loop. That is, if as a result of a given reference voltage drop across the diode 1 the potential at the node A even slightly forward biases the transistor 4, the following operation will occur: The transistor 4 will conduct collector current thereby forward biasing the transistor 6, and the transistor 6 in response will conduct collector current thereby driving the potential at the node A in a direction so as fully to forward bias the transistor 4. As a result of this operation, of course, there will be an increase in both current flowing through the diode 1 and the reference voltage developed across it.

A switching transistor 8 is arranged symmetrically with the switching transistor 4 with their emitter electrodes being connected to a common resistor 9. In this manner a reverse circuit is formed with these switching transistors 4 and 8. The switching transistor 8 has its base electrode connected to the node B of the second current flow path.

The circuit elements of the second current flow path define a voltage divider circuit comprising a series circuit of resistors 10 and 11 and a conventional diode 12. The diode 12 provides temperature compensation for the diode 1. With the foregoing circuit arrangement, the voltage $V_B$ varies in proportion to the power source terminal voltage. That is, the voltage $V_B$ is relatively large when the power source terminal voltage exceeds the minimum requirement and is relatively small when it does not.

A power switch 13 is provided, the operation of the checking device being started by closing this switch. The reverse circuit operates to compare the reference voltage $V_A$ and the detection voltage $V_B$. Preferably, the resistors 9, 10, and 11 are selected as to resistance value such that the detection voltage $V_B$ equals the reference voltage $V_A$ when the actual terminal voltage E equals the minimum requirement $E_S$.

With the foregoing arrangement, under circumstances in which the actual power source terminal voltage E is less than the minimum requirement $E_S$, the transistor 8 conducts upon closing of the power switch. Accordingly, the transistors 4 and 6 will be turned off, and the diode 1 will not light up. On the other hand, under circumstances in which the actual power source terminal voltage E exceeds the minimum requirement $E_S$, the transistor 8 does not turn on; instead the transistors 4 and 6 of the positive feedback loop conduct. By virtue of the closing of the positive feedback loop, the resistor 7 is effectively connected in parallel with the current limiting resistor 2 thereby resulting in increased current flow through the diode 1.

It will be understood that with the foregoing construction the power voltage can be checked visually by observing the luminescense of the luminescent diode 1. There is no need for using a Zener diode for determining the reference voltage, so that ICs can be incorporated easily in the device according to this invention. Furthermore, since the current flowing through the luminescent diode can be regulated in a positive feedback manner, a high discrimination function can be attained by a reverse circuit, even though it is composed of circuits or circuit elements having a lower gain.

The symmetrical circuit arrangement of this invention can minimize the influence of the ambient temperature and is extremely advantageous in view of the temperature commpensation. The shown and described embodiment may be modified in such a manner that the luminescent diode 1 luminesces under condition of $E > E_S$.

What is claimed is:

1. A device for checking whether a power source terminal voltage exceeds a minimum requirement, which comprises:

first and second current flow paths arranged in parallel to draw respective currents from the power source;

the current flow paths including circuit elements arranged to provide reference and detection voltages that differ in magnitude by at least a predetermined amount when the terminal voltage exceeds the minimum requirement;

a luminescent diode serving as one of the circuit elements, the diode being connected in the first current flow path so as to be forward biased and to have the reference voltage developed across it;

the diode also serving as a controllable visual indicator, the diode lighting up when there is current flowing through it in excess of a threshold value;

comparison circuit means having a first input connected to respond to the reference voltage developed across the diode, a second input connected to respond to the detection voltage, and an output for producing a positive feedback control signal when the reference and detection voltages differ by at least the predetermined amount; and switching circuit means responsive to the positive feedback control signal for closing a positive feedback loop so as to increase both the current flowing through the diode and the reference voltage developed across it.

* * * * *